Figure 1:
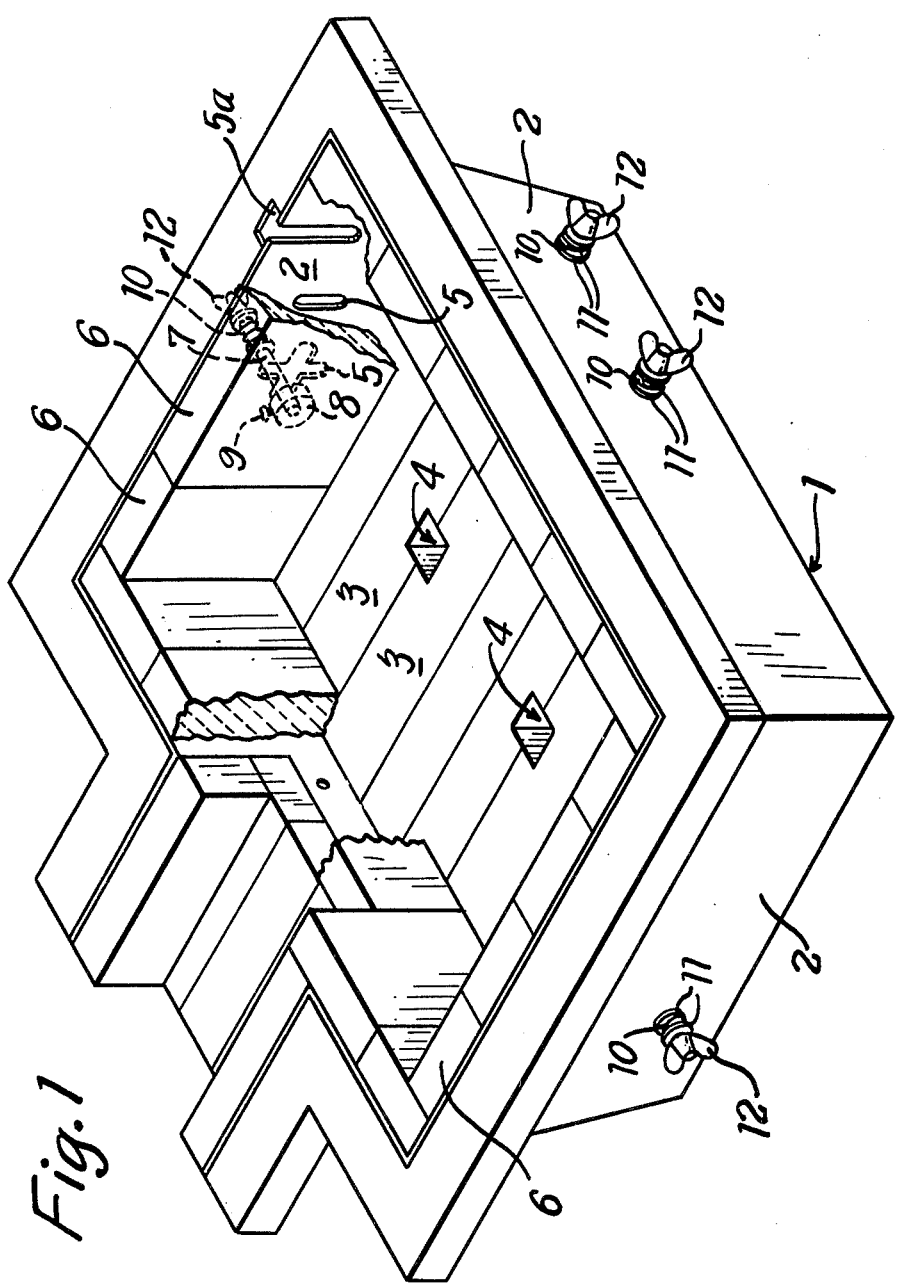

United States Patent [19]

Courtenay

[11] 4,022,358
[45] May 10, 1977

[54] VESSELS FOR CONTAINING MOLTEN METAL

[75] Inventor: John Henry Courtenay, Birmingham, England

[73] Assignee: Foseco International Limited, Birmingham, England

[22] Filed: July 9, 1975

[21] Appl. No.: 594,552

[30] Foreign Application Priority Data

July 11, 1974 United Kingdom ............ 30804/74
June 10, 1975 United Kingdom ............ 24869/75

[52] U.S. Cl. ............................................. 222/607
[51] Int. Cl.$^2$ ...................................... B22D 41/02
[58] Field of Search ................... 266/43; 110/1 A; 52/513, 617; 222/460, 566, 567, 607

[56] References Cited

UNITED STATES PATENTS

| | | | |
|---|---|---|---|
| 2,273,898 | 2/1942 | Short | 52/513 |
| 2,405,610 | 8/1946 | Sampson | 52/513 |
| 3,197,930 | 8/1965 | Kimmlinger et al. | 52/513 X |
| 3,203,689 | 8/1965 | Hallowell, Jr. | 266/43 |
| 3,295,280 | 1/1967 | Kettner | 110/1 A |
| 3,521,698 | 7/1970 | Colombo | 222/460 UX |

Primary Examiner—Drayton E. Hoffman
Assistant Examiner—David A. Scherbel
Attorney, Agent, or Firm—Cushman, Darby & Cushman

[57] ABSTRACT

Vessels for containing molten metal, e.g. tundishes, are formed of a metal case lined with refractory slabs. The slabs are individually replaceable for repair of the lining and are held in place by fixing members passing through the wall or base of the metal case.

10 Claims, 5 Drawing Figures

VESSELS FOR CONTAINING MOLTEN METAL

This invention relates to vessels for containing molten metal, particularly tundishes. For simplicity, the description will be directed mainly to tundishes, but it will be appreciated that the invention is applicable to other vessels having a refractory lined base and wall or walls, e.g. ladles, especially small ladles, launders and crucibles.

In the continuous casting of molten metal to form ingots, molten metal is poured from a ladle via a tundish into a continuous casting mould. The tundish serves as a constant head reservoir and is generally constructed as a metal tank lined with refractory, generally a refractory brick lining with a further inner lining of cast or sprayed refractory or made up of a plurality of slabs of refractory heat-insulating material.

Such tundish constructions are expensive and difficult to maintain. In particular, the permanent brick lining is difficult and time-consuming to install and to keep in repair, the latter because it is difficult to replace only one or a few bricks without rebricking substantial wall areas. Generally, damage after a heat is restricted to a few bricks or groups of bricks.

According to the present invention there is provided a vessel for containing molten metal comprising a metal base and at least one side wall, one or more slabs of refractory material lining the base and a plurality of slabs of refractory material lining the side wall or walls, at least one of the slabs being fixed in place by fixing members engaging the slab and passing through the sidewall or base.

In one preferred type of such vessels, the fixing members are projections which project from one face of the slab, extend through the side wall and are secured on that side of the side wall remote from the interior of the vessel. Thus the slab may carry a projection permanently fixed to the slab which passes through the wall and is secured on the outside.

The fixing members may be bolts which at their outer ends engage the side walls and at their inner ends engage the slab. In one construction the outer end of the bolt has a head which engages the outside of the wall. In another construction the outer end of the bolt is threaded to receive a wing nut or the like. An engaging member in the slab may be a threaded nut or other member capable of engaging a bolt and may be cast into the slab.

Since each of the slabs is held to the tundish wall by a demountable mechanical device, any one slab may be replaced independently of the others. This makes maintenance and repair simpler and prolongs tundish life (i.e. the time between complete relinings).

If desired, there may be an intermediate layer of refractory material between the slab(s) on the base and/or side walls and the base and side walls. Such a layer may be cast in situ or pre-cast and fitted into position, and should have apertures to permit the projections or bolts to pass through it. Such an intermediate layer may be a cast aluminous concrete. Use of such a layer is preferred in large vessels to lower the weight of the lining slabs needed.

In addition to the lining of refractory slabs and the intermediate layer just noted, the vessel may additionally be provided with an inner expendable lining of refractory heat-insulating material. The construction and advantages of such an inner expendable lining are described in U.S. application Ser. No. 312,274, filed Dec. 5, 1972, which application is commonly assigned with the present application.

The refractory slabs for lining the side walls are preferably of an aluminous cement or concrete material, most preferably including 40 – 70% by weight $Al_2O_3$. The material may be reinforced, e.g. with refractory inorganic fibre or with steel fibres, and may include a density lowering additive such as hollow aluminum silicate microspheres. The slabs should preferably have good thermal shock resistance and be able to stand thermal cycling from room temperature to 1600° C for at least 200 cycles. If an inner refractory heat-insulating lining is used, this desirable property may be modified to an ability to withstand thermal cycling from room temperature to 900° C for at least 200 cycles.

Figure 3A:
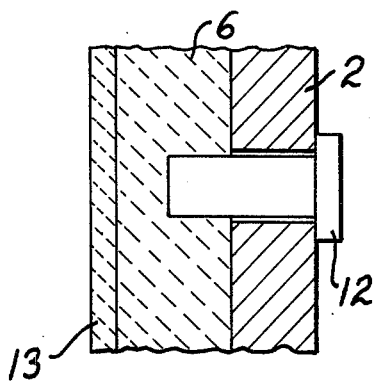
Figure 2:
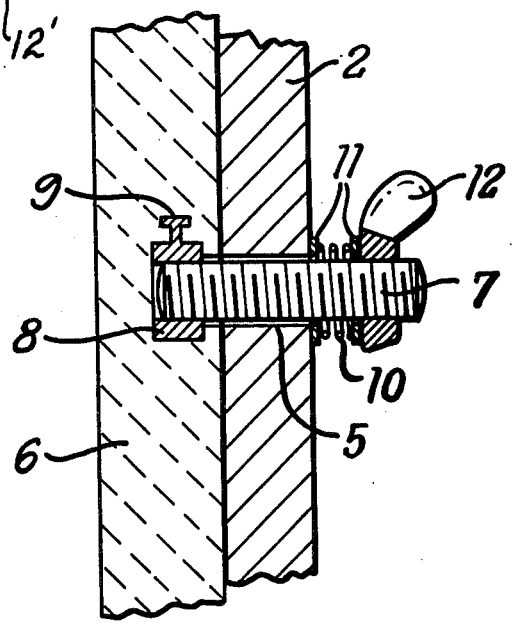
Figure 3B:
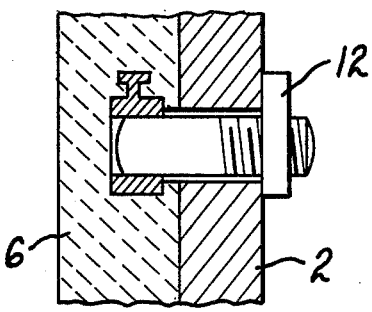
Figure 3C:
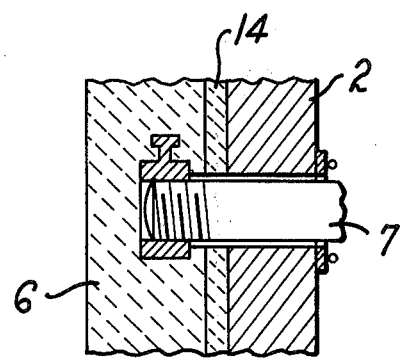

The invention is illustrated by way of example, with reference to the accompanying diagrammatic drawings, in which FIG. 1 shows a tundish according to the invention, shown with parts broken away, FIG. 2 shows a section through a side wall, and FIGS. 3a–3c are diagrammatic views partly in section and partly in elevation through a side wall.

Referring to the drawings, the tundish comprises a metal base 1 having a plurality of upstanding metal side walls 2. The base is lined with refractory panels 3 and a conventional nozzle 4 is set therein. Slabs 6 of refractory material may be fitted in position on side walls 2 to line the walls of the tundish using headless bolts 7 which engage in the back of the slabs through apertures 5 in side walls 2. When the slabs are in position they are retained therein by wing nuts 12 engaging the bolts 7.

Gaps between the slabs can be sealed using conventional sealants. Base panels 3 are secured in position by sidewall slabs 6. The joints between panels 3 and the base of slabs 6 are preferably rebated to aid sealing. Preferably an inner expendable lining of slabs of refractory heat-insulating material is then inserted to complete the tundish, as shown diagrammtically at 13 in FIG. 3a.

The slabs 6 are cast of refractory material such as aluminous cement or concrete and have nuts 8 cast therein, the nuts being held in position by anchors 9. A slab 6 may have a plurality of threaded nuts in threaded engagement with bolts, one such nut being shown at 8 in FIG. 2. The slab 6 is held parallel to the wall 2 of the tundish.

At the end of the bolt 7 outside the wall 2 is a compression spring 10 held between washers 11 and a wing nut 12 is threaded onto the free end of the bolt 7 to the extent required to hold the slab against the tundish wall. The nut 12 abuts the outer wall 2 of the vessel through the spring 10 and washer 11, or as shown in FIG. 3b. A bold 7 may have a head 12' at the outer end thereof abutting the wall 2 and at the inner end engaging the slab 6 as shown in FIG. 3a. If the slab becomes eroded or otherwise damaged in use it may be replaced without disturbing the whole of the rest of the lining. If desired, between the side walls 2 and the slabs 6 lining the side walls 2 there may be disposed an intermediate layer of refractory material 14 having holes through which the fixing members 7 pass, as shown diagrammatically in FIG. 3c.

In place of the demountable bolts 7, and nuts 8, the slab 6 may have members embedded in the slab and projecting from the rear face thereof. On installation, the projecting members pass through the apertures 5 and the slab 6 is secured in position e.g. by attaching a clip to the projecting member, welding it to wall 2 or merely bending it over. In place of apertures 5, slots 5a may be provided to enable a bolt to be placed in the rear of slab 6 and the assembly of slab and bolt then slotted into position.

The present invention includes both vessels for containing molten metal as described above, and refractory slabs having engagement means set therein and being suitable for use in the repair of such vessels.

I claim as my invention:

1. A vessel for containing molten metal comprising a metal base wall and at least one side wall, at least one slab of refractory material lining the base wall, and a plurality of slabs of refractory material lining the side wall, fixing members passing through a wall and engaging at least one of said slabs so as to fix said slab in place, said fixing members permitting the slab fixed thereby to be removed from the vessel independently from the other slabs for repair, and an inner expendable lining of refractory heat-insulating material on said slabs for contact with the molten metal to protect said slabs from wear caused by said metal.

2. A vessel according to claim 1 wherein the fixing members are projections permanently fixed to the slab which extend through the wall and means on the outside of the wall for engagement with said projections to hold the slab in place.

3. A vessel according to claim 1 wherein the fixing members are bolts which at their outer ends have heads abutting the side walls and at their inner ends engage the slab.

4. A vessel according to claim 3 wherein the slab incorporates a plurality of threaded nuts in threaded engagement with the bolts.

5. A vessel according to claim 1 wherein the fixing members are bolts whose ends remote from the slab are threaded and engage a threaded nut abutting the outer wall of the vessel.

6. A vessel according to claim 1 wherein between the side walls and the slabs lining the side walls there is an intermediate layer of refractory material having holes through which the fixing members pass.

7. A tundish comprising a metal base wall and at least one sidewall, at least one slab of refractory material lining the base wall, and a plurality of slabs of refractory material lining the side wall, fixing members passing through a wall and engaging one of said slabs so as to fix said slab in place, said fixing members permitting the slab fixed thereby to be removed from the vessel independently from the other slabs for repair, and an inner expendable lining of refractory heat-insulating material on said slabs for contact with the molten metal to protect said slabs from wear caused by said metal.

8. A tundish according to claim 7 wherein the slabs comprise aluminous concrete.

9. A tundish according to claim 7 wherein the slabs comprise refractory fibre reinforcement.

10. A tundish according to claim 7 wherein the slabs comprise metal fibre reinforcement.

* * * * *